United States Patent [19]

Bissell et al.

[11] Patent Number: 5,345,400
[45] Date of Patent: Sep. 6, 1994

[54] METHOD OF CALIBRATING MECHANICAL PRESSURE GAUGES

[75] Inventors: Ronald D. Bissell, Orange; Nicholas E. Ortyl, III, Middletown, both of Conn.

[73] Assignee: Dresser Industries, Inc., Dallas, Tex.

[21] Appl. No.: 792,370

[22] Filed: Nov. 15, 1991

Related U.S. Application Data

[63] Continuation-in-part of Ser. No. 570,913, Aug. 22, 1990, Pat. No. 5,067,100.

[51] Int. Cl.$^5$ .......................... G01L 7/04; G06F 15/46
[52] U.S. Cl. ................................ 364/571.01; 364/558; 73/4 R
[58] Field of Search .................... 364/571.01, 571.02, 364/571.05, 571.06, 571.07, 571.08, 580, 505, 506, 558; 73/741, 740, 742, 743, 1 R, 4 R

[56] References Cited

U.S. PATENT DOCUMENTS

| 3,948,103 | 4/1976 | Rosaz | 73/419 |
|---|---|---|---|
| 4,019,363 | 4/1977 | Sanford | 73/1 R |
| 4,055,085 | 10/1977 | Wetterhorn | 73/419 |
| 4,109,537 | 8/1978 | Gorgens et al. | 73/756 |
| 4,148,123 | 4/1979 | Neubeck et al. | 29/407 |
| 4,168,631 | 9/1979 | Wetterhorn et al. | 73/741 |
| 4,237,738 | 12/1980 | Wetterhorn | 73/740 |
| 4,240,298 | 12/1980 | Wetterhorn | 73/732 |
| 4,246,796 | 1/1981 | Wetterhorn | 73/732 |
| 4,337,664 | 7/1982 | Kipp et al. | 73/741 |
| 4,361,046 | 11/1982 | Wetterhorn et al. | 73/711 |
| 4,378,160 | 3/1983 | Vlad et al. | 356/358 |
| 4,444,057 | 4/1984 | Wetterhorn | 73/739 |
| 4,481,596 | 11/1984 | Townzen | 364/571 |
| 4,485,676 | 12/1984 | Wilson | 73/741 |
| 4,502,334 | 3/1985 | Gorgens et al. | 73/705 |
| 4,542,654 | 9/1985 | Wilson et al. | 73/741 |

FOREIGN PATENT DOCUMENTS 60-73436  4/1985  Japan .

Primary Examiner—Thomas G. Black
Assistant Examiner—Michael Zanelli
Attorney, Agent, or Firm—Harris, Tucker & Hardin

[57] ABSTRACT

Mechanical pressure gauges may be calibrated for linearity by a method which uses the pressure element's initial and final position at zero and full gauge pressure to determine the setting for span (gain) and starting angle of a segment gear. These are then set when the gauge is assembled to provide a completely calibrated gauge without alternately changing first one then the other of the interrelated span radius and starting angle to adjust linearity of a gauge. A vision system is utilized to perform the steps of precisely measuring the initial and final tip position on a reference plane. This information is used along with the geometry of the four-bar gauge linkage to determine the necessary span radius and starting angle, which is a function of the tip to segment gear pivot point distance. These distances can be individually set on each gauge by conventional mechanical measuring tools within tolerances which will immediately produce an assembled gauge within a desired linearity specification.

38 Claims, 6 Drawing Sheets

TIP TRAVEL: 0.16 IN.
TIP X DISTANCE FROM PINION: 1.75 IN.
LINK LENGTH: 0.75 IN.
GEAR RATIO: 11.6

BETA ANGLE: 9 DEG.
TIP Y DISTANCE FROM PINION: 0.37 IN.
PINION TO SEGMENT PIVOT DISTANCE: 1.3125 IN.
DIAL ARC: 270 DEG.

METHOD OF CALIBRATING MECHANICAL PRESSURE GAUGES

CROSS-REFERENCE TO RELATED APPLICATIONS

This is a continuation-in-part of our pending U.S. patent application Ser. No. 07/570,913, now U.S. Pat. No. 5,067,100, filed Aug. 8, 22, 1990, having the same title, for which benefit under 35 U.S.C. 120 is claimed.

BACKGROUND OF THE INVENTION

1. Field of the Invention

The invention relates to a method for effecting the calibration of a mechanical pressure gauge to achieve a required degree of linearity between movement of the pointer of the gauge and the applied pressure.

2. Summary of the Prior Art

Mechanical pressure gauges consist of a pressure measuring element and a mechanism (commonly called a "movement") which converts the generally linear motion of the pressure movable element into rotary motion of a pinion upon which is mounted a dial indicating pointer which indicates pressure on a circular dial. Because of the geometric relationship between the moving pressure element and the rotational movement of the pinion, the rotation of the pointer is not linear with respect to the motion of the pressure movable element. Typical gauges of this type are shown in U.S. Pat. Nos. 4,055,085, 4,148,123, 4,240,298, 4,361,046, and 4,542,654. For each of the typical pressure gauges shown in the aforementioned patents, the best degree of non-linearity of pointer rotation which can be achieved approximates a sine wave as shown in the graph of FIG. 1. As shown there, the error varies from zero at the zero pressure and maximum pressure ends of the pointer dial and progresses in a sine wave between these two points with another zero being recorded at the midway point or 135° position for a gauge with a 270° range. (Not all gauges have a 270° dial). The permissible non-linearity of highly accurate industrial pressure gauges is preferably less than one quarter of one percent. If this degree of non-linearity, or less, is obtained, then the gauge will readily meet the accuracy requirements of the industry which are generally on the order of not more than one half of one percent. Unacceptable calibration curves are also shown in FIG. 1, even though the calibration error is zero at full scale, illustrating the importance of checking the accuracy of the calibration at one or more pressures intermediate zero and full scale.

To obtain the ideal "baseline" curve, a variety of adjustments have heretofore been employed, such as rotating the movement mechanism, bending the tip of the Bourdon type pressure element, or adjusting the length or span of a connecting link between the pressure element and the segment gear. Any one of these adjustments, even though limited to very. small magnitudes, may drastically effect the non-linearity of the pressure scale at mid scale by as much as one half of one percent. Any one adjustment generally requires another variable to be adjusted.

Each of the aforementioned patents mention the calibration problem. As stated in U.S. Pat. No., 4,148,123:

"It is obvious that every adjustment of the span necessarily changes linearity and that every adjustment in linearity in turn influences the span so that as a rule the span and linearity have to be adjusted several times in an alternating fashion until the desired display tolerances are attained. It is self evident that the conventional adjustment procedure is thus a time consuming and expensive operation."

Calibration for linearity was accomplished only by skilled operators who could, by experience, judge the type and amount of adjustments needed, make the adjustments, and then check the position of the pointer at zero, quarter scale, mid scale, three quarter scale and full scale to determine whether the proper adjustment had been made. Many iterations of this procedure were required in order to achieve the desired accuracy. Obviously, if the amount of movement rotation, tip bending or span adjustment were known in order to change any midpoint non-linearity to the desired zero level, the known amount of adjustment could be made without the need to readjust and recheck the linearity many times.

SUMMARY OF THE INVENTION

In brief, the prior invention disclosed in our parent Ser. No. 07/570,913 and incorporated herein by reference, was a significant advance over the hand calibration methods in that an analogue "baseline" model was developed to reflect the amount of nonlinearity in the linkage of a correctly calibrated example gauge. The baseline model was manipulated to selected angular positions of the segment gear which is pivoted and turns the pinion gear which drives the gauge pointer. For a given gauge material and geometry, a family of curves was developed based upon potential different starting angles of the segment gear and this data used to establish a relationship (linear) between pointer rotational position (degrees) and the amount of non-linearity at a reference pressure most selective of linkage nonlinearity (usually 50% of range). This relationship then was used to back correct the segment gear angular position by rotating the movement an amount determined by the linear relationship to a place on the curve where the minimum non-linearity was found. Several iterations of this procedure were sometimes employed in order to attain the desired non-linearity.

The prior invention provided a method of quickly and inexpensively setting the span and linearity of a highly accurate pressure gauge without a high degree of operator skill. Although the method is generally applicable to pressure gauges with any desired degree of nonlinearity, it was most useful when applied to gauges having $\frac{1}{2}$ or $\frac{1}{4}$ percent or less nonlinearity capability. A computer program is used to make the necessary calculations and lead an unskilled operator through a sequence of steps which result in calibration of a gauge to one quarter percent of full scale or better. Even very skilled operators had difficulty reaching that level of non-linearity with manual adjustments because the skill required and number of iterations of adjustment increases many fold as the desired non-linearity goal is reduced. The new procedure recognized that the gauge pointer itself amplifies and can be used to precisely measure very small angular displacement of the movement or segment. No tip bending or link length adjustment was required.

The present invention is an improvement in which it was recognized that it is possible to use only the pressure element's initial and final positions to indicate the amount of linearity adjustment and the gain adjustment that is required, to calibrate the pressure system without the need to assemble the gauge, repetitively adjust, and check the gauge in order to calibrate it. After measuring the initial and final positions of the end of the Bourdon tube (or similar parameters on other pressure elements) a mathematical analysis is conducted in order to determine the correct settings (adjustments) for the geared segment of the movement and the gain adjustment, the gain adjustment being the distance between the pressure element connecting link "B" (FIG. 2A) and the pivot point or axis of the segment gear. Once the correct settings of the gain adjustment and the segment gear tip to pivot point axis (starting angle) are found, the pointer is set at the zero position, and the gauge is now calibrated without further adjustments. Then the assembled gauge is inspected on a pressure stand only to verify its accuracy.

The present invention recognizes that it is impossible to manufacture a Bourdon tube which has exactly the same initial tip position and exactly the same response to the same amount of pressure. It recognizes that if the initial position of the center of the hole in the end of the tip of the Bourdon tube and the final position of the tip at full gauge pressure can be measured accurately enough, the known geometrical arrangement of the remainder of the gauge linkage which leads from the connection with the tip to the pointer pinion gear (four-bar linkage), can be mathematically evaluated, preferably by means of a programmed computer means, to determine a corrected setting for the span adjustment distance that will span the gauge with a particular individual Bourdon tube. Once the corrected span adjustment distance is known (gain), the starting angle of the segment gear can be mathematically evaluated to produce a low or minimum non-linearity, which when assembled will produce a calibrated gauge without further adjustment or calculation.

TYPICAL GAUGE LINKAGE

For the purposes of the disclosure of this invention, the gauge that will be utilized as an example for calibration is that sold by the Instrument Division of Dresser Industries at Stratford, Connecticut, under the names of ASHCROFT DURAGAUGE® or TEST GAUGE® pressure gauges. DURAGAUGES® have one half percent while TEST GAUGES® have one quarter percent guaranteed percent non-linearity full scale. To aid in understanding the method of this invention, a schematic view of the pertinent working elements of a gauge is shown in FIGS. 2A, 2B, 2C, 3 and 4 of the drawings, and will be briefly described.

As shown in FIG. 3, the pointer tip of the gauge cooperates with a rotary dial bearing indicia from zero to maximum pressure over a span of 270 degrees, in this example zero to 100 percent. The pointer is mounted on a pointer shaft (FIG. 2B) which is angularly shifted by a pinion which is driven by a gear segment called a segment gear. The gear segment has a radial toothed portion and a hole for receiving a segment shaft (FIG. 2C) which constitutes a "pivot pin" for the segment gear around which the segment pivots. The segment shaft is supported between a lower mounting plate and an L-shaped top plate which are spaced and secured together by two tubular spacers suitably fastened in place between the plates. It is easier to visualize the segment gear as having an extended lever arm 16 as in FIG. 4 beyond the pivot point "A" which produces a "gain" to vary the arc over which the toothed end moves. The "slide" in FIG. 2A in effect is that lever arm because the link is connected to the slide at "B" which is attached to the segment gear with a micrometer adjustment screw which is convenient to make small adjustments.

The Bourdon tube (FIG. 2A) is supplied with pressured fluid through the fluid pressure inlet. The tip of the Bourdon tube is connected to the segment by a connecting link to a movement mechanism. The entire movement mechanism may be angularly adjusted relative to the center of the dial indicator or pointer of the gauge by loosening and then tightening the mounting screws which cooperate with arcuate slots 44 in the lower mounting plate (FIG. 4) of the movement mechanism.

The movement of the end of the Bourdon tube in response to applied pressure is transmitted by a linkage to the pivotally mounted end of the segment at an adjustable distance from the pivot to produce a "gain" in the pivoting movement of the segment and pointer. The axis of the pivotal mounting is designated at point A on the movement. The linkage may include a bimetallic temperature compensator and the connecting link. The temperature compensator is not involved in the calibration method of this invention hence the connecting link may be considered as being a fixed length, rigid link.

As best shown in FIGS. 2A and 2B, the connecting link is roughly of U-shaped configuration and may include having its free ends interconnected by a fine thread, micrometer adjustment screw. The connecting link is attached to a serpentine metal band which is called a "slide". A mounting bar projects from the medial portion of the slide and is adjustably secured to the radial portion of the segment gear by two screws which traverse a span adjustment slot in the segment gear radial portion. This provides a coarse adjustment for the span adjustment distance. At another location on a bight portion of the slide a pivot tab defines a hole having an axis B which receives a screw for pivotal connection to the connecting link. But for purposes of the method the connecting link can be treated as though it is a fixed flat piece pivotally connected at both ends.

The distance between points A and B is commonly referred to as the span adjustment distance (FIG. 2A). When a line is drawn between point A and the pointer shaft center axis C, and another line is drawn from point A radially along the centerline to the periphery of the segment gear, the angle between such lines is known as the segment angle, as shown in FIG. 2A. Similarly, a line drawn between pivot points B and D and the aforementioned radial line along the centerline of the segment when no pressure is applied to the gauge, may define a "starting" angle. These distances and angular relationships are reflected in FIGS. 4-6 to be discussed.

It is almost axiomatic that every gauge, once assembled, requires calibration. The linkage produces some non-linearity between actual pressure applied and the gauge pressure reading.

DETAILED DESCRIPTION

Figure 1:
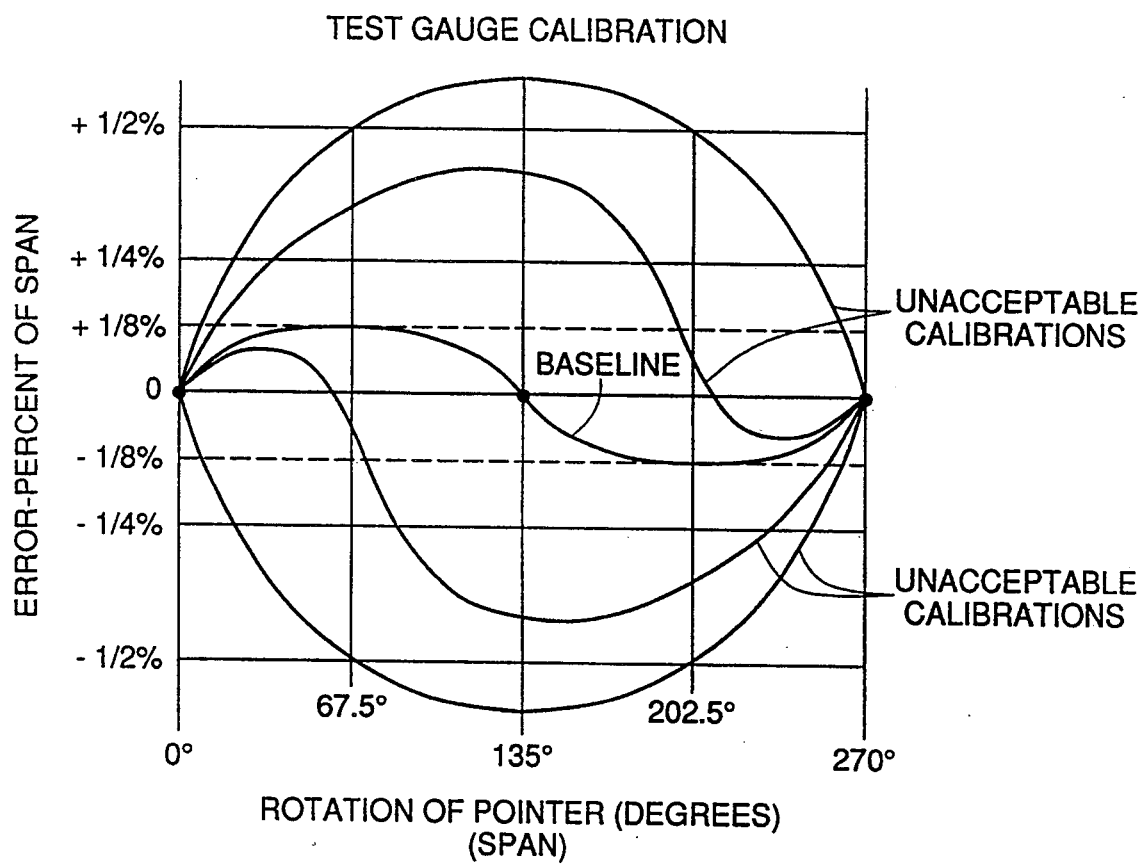
FIG. 1 is a view illustrating the normal linearity curves and an ideal "baseline" curve for a conventional Bourdon type gauge.

The method is based on the discovery that it is possible to accurately measure the initial position and the final position of the tip of the pressure responsive element, in this case the Bourdon tube, with respect to the center of the pinion gear which is also the center of the gauge movement, to determine the nonlinearity produced by the segment gear. The two adjustable parameters of the linkage are the span radius and starting angle of the segment gear. The inherent nonlinearity of the linkage represents a sinusoidal curve as shown by the baseline in FIG. 1.

Figure 4:
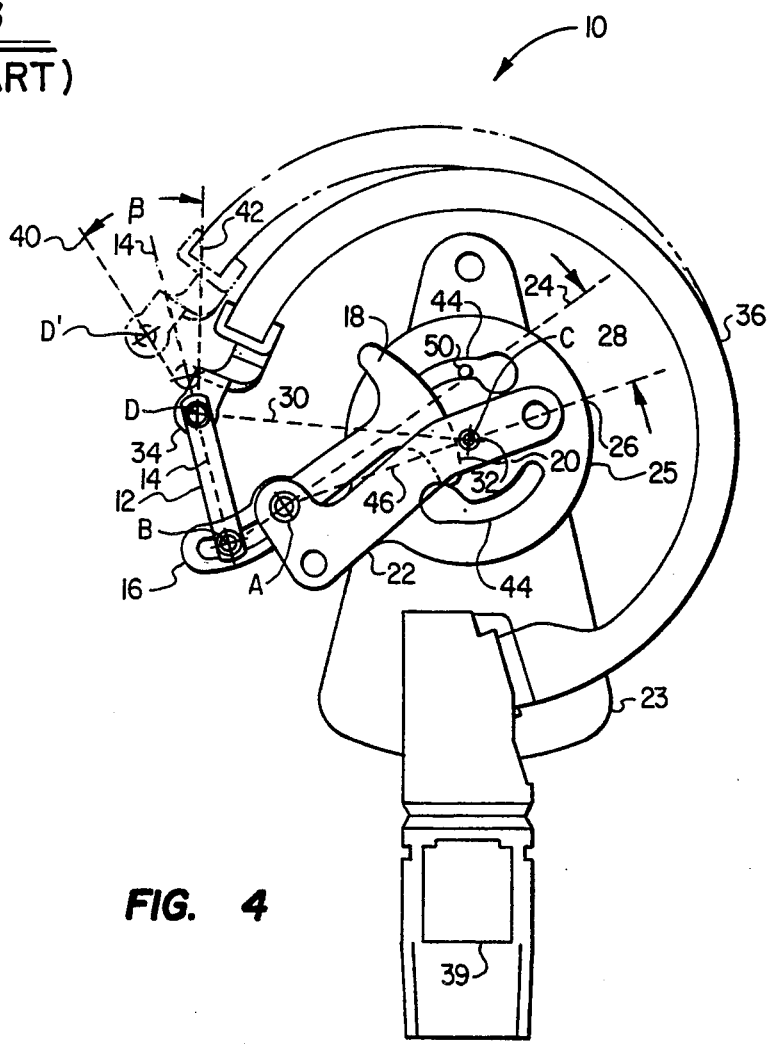
FIG. 4 is a front elevational schematic view illustrating a conventional "four-bar" linkage similar to FIG. 2A, showing in phantom position, the full pressure position of the Bourdon tube.

FIG. 4 represents the Bourdon tube and linkage of the typical gauge 10 which have been removed from the case and illustrated in somewhat schematic form. The initial position of the gauge tube is shown in solid, and the final position of the pressurized gauge tube is shown in phantom in FIG. 4. The point D represents the tip of the pressure responsive element in its initial unpressurized position and the point $D^1$ is the tip position at full pressure. Point D represents the center of the opening to which the connecting link 12 in FIG. 4 is attached. The connecting link 12 may be considered as a solid piece having openings at opposite ends, one of which is pivotally linked at pivot point D. The center line 14 of connecting link 12 runs through the center of the pivot point D and the opposite pivot point B which is connected to a slotted end portion 16 of segment gear 18 having teeth 20 which engage the pinion, the center of which is shown at pivot (axis) point C in FIG. 4. The segment gear is pivoted at pivot point A to top plate 22 which overlies the segment gear as indicated in the prior art drawings of FIGS. 2A-C. The center line axis 24 of the segment gear passes through pivot point A. Another axis 26 also passing through pivot point A, passes through the center of pivot point C which corresponds to the vertical axis through the center of the pinion shaft of pinion gear 32. The angle designated 28 formed between center line 24 of the segment gear and axis 26 is the segment angle at zero pressure. A distance 30 passing through pivot points C and D together with axis 14 extending between pivot points B and D along the center line of the connecting link and horizontal axis 24 drawn between points B and C, forms an important triangle in an imaginary plane parallel to the face of the gauge, which may be referred to as a reference plane. It is a plane in which the opening in the flattened tip 34 of the Bourdon tube 36 is found. The Bourdon tube has a pressure inlet 38 for connection to a source of fluid pressure in order to pressurize the gauge.

When the gauge is pressurized as indicated by the phantom position of the Bourdon tube in FIG. 4, pivot point D moves to the position $D^1$ along the path of a line 40, which is seen to move upwardly and outwardly away from the original position D. Together with a vertical line 42 running through pivot point D is formed the angle beta which reflects the deviation of the movement of the tip 34 from vertical axis. It must be understood that the pivot points A and C are fixed and do not move in response to the movement of the tip of the Bourdon tube. However, the connecting link does move and pulls the slotted end 16 of the segment gear upwardly causing the teeth 20 to rotate the pinion 32 at pivot point C. Bourdon tubes of a given geometry and material of construction will move roughly the same distance upon full pressurization, but the exact position D will vary significantly enough to cause quite significant differences in the rotation of the pinion because of the magnifying effect of even small amounts of deviation in the initial tip position and pressure spring rate from tube to tube. The initial position D of the tip with respect to the center C will vary on a statistical basis. It should be kept in mind that the segment angle 28 can be altered over the whole range depending upon the relative rotational position of the center portion of the gauge works which is rotatable on the back plate 23 (FIG. 4) without disconnecting any of the gauge linkage parts. This is indicated by the slotted openings 44 in lower plate 25 which rests removably on back plate 23. Back plate 23 is fixedly connected to the inlet end portion of the Bourdon tube.

The inventors have surprisingly discovered that it is possible to measure the initial and intermediate or preferably the final tip position locations for a particular gauge linkage and use this information, with the aid of a computer program, to determine a corrected span radius or gain (distance from A to B) produced by the operation of the link 12 on the lever arm 16 of the segment gear 18 and also to determine a corrected angle for the segment gear which will produce minimum nonlinearity in that particular Bourdon tube gauge linkage. When these corrections are made to the actual gauge linkage, the gauge is calibrated without further manipulation. The actual settings on the gauge linkage of the span radius A to B and the position of the pivot point A with respect to the center of the tip pivot point D surprisingly require an accuracy of only about $\pm\frac{1}{2}$ thousandths of an inch, within the range of conventional mechanical measuring equipment. However, in order to produce gauges having $\frac{1}{2}$ or $\frac{1}{4}\%$ or less non-linearity capability, it is necessary to measure the position of the tip of the Bourdon tube within about 2/10,000 of an inch, and this requires some special equipment which will be discussed below.

Figure 5:
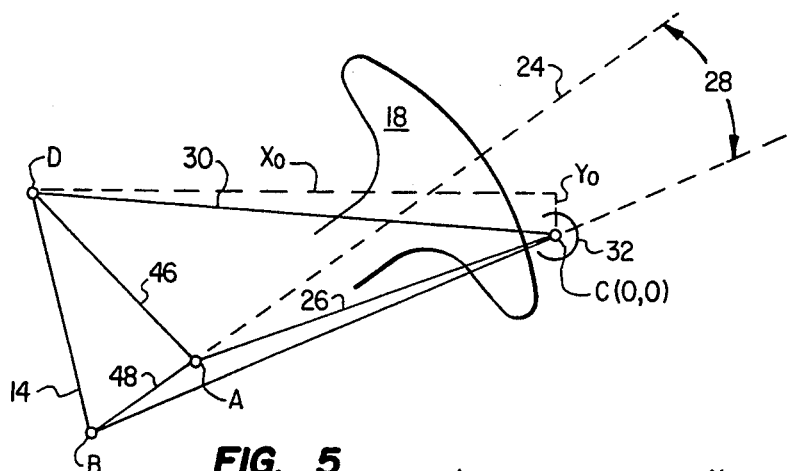
FIG. 5 is a schematic view of the distances and angular relationships of the important connection points in the gauge linkage, with the tip in the initial position.
Figure 6:
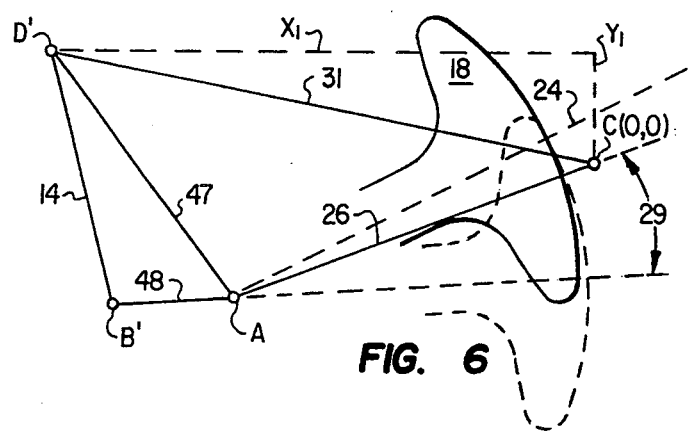
FIG. 6 is a schematic view of the distances and angular relationships of FIG. 5, but in the pressurized position of the tip.

The spatial and angular relationships between the pivot points A–D are shown in FIGS. 5 and 6 for an exemplary gauge. FIG. 5 schematically represents the angular and spatial relationships with the Bourdon tube at zero gauge pressure and FIG. 6 represents the angular and spatial relationships with the Bourdon tube pressurized to some gauge pressure, especially 100% gauge pressure. In FIG. 5 pivot point D represents the center of the link opening in the tip of the Bourdon tube and pivot point C is the center of the gauge movement which is indicated to have the rectangular coordinates (0,0). Indicated on FIG. 5 are the rectangular coordinates YO and XO which represent the respective vertical and horizontal distances of the tip "D" from the center "C". This is indicated as the distance 30 which was shown on FIG. 4. It will be noted that along the center line 14 of link 12 is a fixed distance between D and B. The segment pivot point axis A is a fixed distance A to C from the center. The distance between A and B is the span radius 48 which is variable over a range of fixed settings. A center line 24 of the segment gear 18 is shown as well. It can be seen that if the actual coordinates of the tip D are accurately measured with respect to the center taken as the zero point, a right triangle having the sides XO, YO and 30 is formed which makes it possible to determine the distance 30. The distance along the axis 26 between A and C is also fixed by the physical location of the segment pivot axis with respect to the center. Distance 14 is known because it is a fixed link length, so that at any given setting of the span radius 48 ("gain"), the distance between A and B, it is possible to calculate all of the angular relationships in triangles which can be seen between the pivot points shown in FIG. 5. These triangular relationships can be evaluated using trigonometry to determine the resulting segment angle 28 between the axes 24 and 26. They can similarly be used to determine different segment angles which result from any other position of the tip as it moves along its path 40.

FIG. 6 represents an altered position of the gauge train linkage when the tip has moved to a new position $D^1$ as a result of pressurizing the Bourdon tube. It would be the "final" tip position if full pressure is applied. The distance $B^1$ to $D^1$ remains the same because the link length is constant and the distance between A and $B^1$ is the same because it was set at a nominal distance. The distance A to C remains constant but the distance 47 between A and $D^1$ is greater than the distance 46 between A and D because of the movement of the tip. Naturally, the distance 31 between C and $D^1$ is greater than the distance 30 for the same reason. The vertical and horizontal coordinates Y1, X1 also indicate greater magnitudes as a result of the new position $D^1$ of the tip. The segment gear may move to a position such as indicated by the dotted lines establishing a segment angle 29.

If the rectangular coordinates of the new tip position $D^1$ are precisely measured, the new distance 31 between C and $D^1$ can be calculated. Since the distance between $D^1$ and $B^1$ and the distance 48 are fixed, the trigonometric relationships can be used to determine the distance 47 between A and $D^1$ and the new segment angle 29. This set of relationships can be determined at any incremental tip position $D^1$ between zero and full gauge pressure. Once we know the final position of the tip where $D^1$ results from application of the full gauge pressure, we can calculate the span radius or gain 48 between pivot points A and B to cause the segment gear to move the correct amount to produce rotation of the pivot gear and pointer 270° because the gear ratio between the segment and pivot gears are fixed, in this case, at 11.6 and the full gauge range from 0 to full gauge pressure is 270°. (Other gauges might have a different gear ratio and a different angular range.) The span radius 48 represents a lever arm on the segment gear which produces the necessary gain for movement of the tip between the position D and the position $D^1$. For example, where the tip travel between 0 and full pressure is 0.16", the dial arc is 270° and the gear ratio is 11.6, the span radius to equal to the tip travel divided by the arc through which the segment must move. The arc of the segment gear travel $(270°/11.6) \times (\pi/180)$ equals 0.4062 radians. Then 0.16 divided by 0.4062 equals a span radius of 0.3939". That lever arm on the segment gear will cause the segment gear to move through an arc which will rotate the pinion gear exactly 270°. These calculations are preferably performed with a computer means which is programmed to accept the measured positions of the tip and the fixed or set distances of the gauge linkage train from tip to pinion gear.

Now a software routine is utilized in which the fixed distances are inputs along with the precisely measured initial and final tip positions at zero and full pressure. The routine using trigonometry and Herrons' formula is able to calculate the initial (zero pressure) starting angle of the segment gear. Using the knowledge that the Bourdon tube moves directly proportional to the applied pressure, the amount of tip movement can be determined for any position between initial (zero) and final (full) gauge pressure. It is convenient to include a loop in the program which will take the fixed and measured inputs through a sequence of iterations, conveniently in 10% increments of gauge pressure. Taking the selected nominal span radius and tip to segment distance at the initial (zero) condition, the segment angle is calculated, preferably in 10% increments. Since with an 11.6 gear ratio the segment angle should cover a range of approximately 23.3°, it should cover approximately 2.33° for a 10% increment. The program treats the tip as having moved a distance equal to 10% of its actual measured range, or in example case 0.016". Assuming that the tip has moved that much, the program calculates the segment angle which has resulted from that 10% movement which should have produced a change in angle of approximately 2.33°. In fact, the calculated angle will differ slightly and that difference represents the non-linearity of the gauge linkage which is converted into a percent non-linearity based on the full scale of the gauge itself. These calculations are repeated for each 10% increment in tip movement from initial to final positions and the nonlinearity percent full scale determined at each one of them.

Then the non-linearity at 100% is tested by the program to determine the magnitude of the error. The span radius is incremented by an amount proportionate to the amount of error. For example, if the full scale non-linearity is ±1%, the span radius may be incremented by ±0.001" whereas if the non-linearity full scale is ±0.02 the span radius might be incremented by an amount equal to ±0.0001". If the percent non-linearity determined in the previous step is greater than the desired amount, the previously described movement is repeated with the incremented span radius however many times it takes until the desired percent nonlinearity at 100% is obtained whereupon the program proceeds to the next loop which works on the tip to segment distance (starting angle alteration).

The next loop might be referred to as movement adjustment which takes into account the changes in the tip to segment pivot point distance from a nominal that had been selected and set as a "fixed" variable at the beginning of the computer routine. The program first tests the non-linearity error at mid-scale because it is known that gauges of this type will have nearly zero error at the mid-scale point as indicated by the baseline curve in FIG. 1. It should be done at the intermediate scale position most representative of non-linearity. If the test shows that the non-linearity at the 50% point is below the desired amount the remainder of the routine need not be run. In this case the computer means would print out the nominally selected tip to segment distance as the proper one. It is preferable to again use the 10% increment approach based upon the measured initial and final X and Y distances of the Bourdon tube tip. The mid-scale point corresponds to half of the movement between 0 and full pressure.

The distance of the segment pivot axis from the tip at the 50% of travel point is incremented proportionate to the amount of non-linearity error that was calculated to have occurred if the tip had moved halfway between initial and final positions. That is to say, if the percent of non-linearity was 1% at the halfway point, the tip to segment pivot point distance might be incremented or decremented 0.001". If the non-lineaxity error at the midpoint was 0.05 %, the tip might be incremented 0.0005". With the incremented tip to segment pivot axis distance, the program recalculates the segment angle, preferably at 10% intervals between zero and full scale. The program includes the calculation of the percent non-linearity at each of these intermediate positions which can be conveniently displayed in form of a table to show the calculated non-linearity of the particular gauge movement being evaluated. Such a table for a calibrated gauge is seen in Table 1 and graphically displayed in FIG. 7. FIG. 8 represents a flow diagram which illustrates how conventional software routines may be arranged to carry out the sequence of steps to perform the calculations which are used in the gauge calibration method. One skilled in the art would know how to compose such a program.

TABLE 1

| Pressure Percent Full Scale | Nonlinearity Percent Full Scale |
|---|---|
| 0 | 0 |
| 10 | .101 |
| 20 | .136 |
| 30 | .12 |
| 40 | .069 |
| 50 | −.002 |
| 60 | −.075 |
| 70 | −.131 |
| 80 | −.152 |
| 90 | −.116 |
| 100 | 0 |

Tip to Segment Shaft Distance: .7740121 inches.
Span Radius Distance: .3940772 inches.
Starting Angle (Referenced to center line of movement): 7.257963 degrees.
Total Angular Travel of Pointer: 270.0004 degrees.

Figure 7:
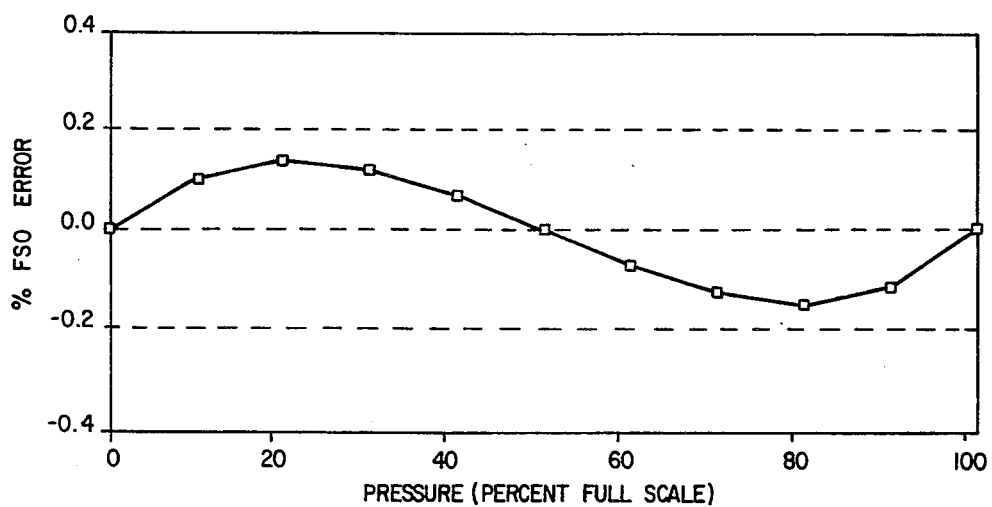
FIG. 7 is an example plot showing percent full scale error over the full range of pressure with actual dimensions for an example gauge.
Figure 8:
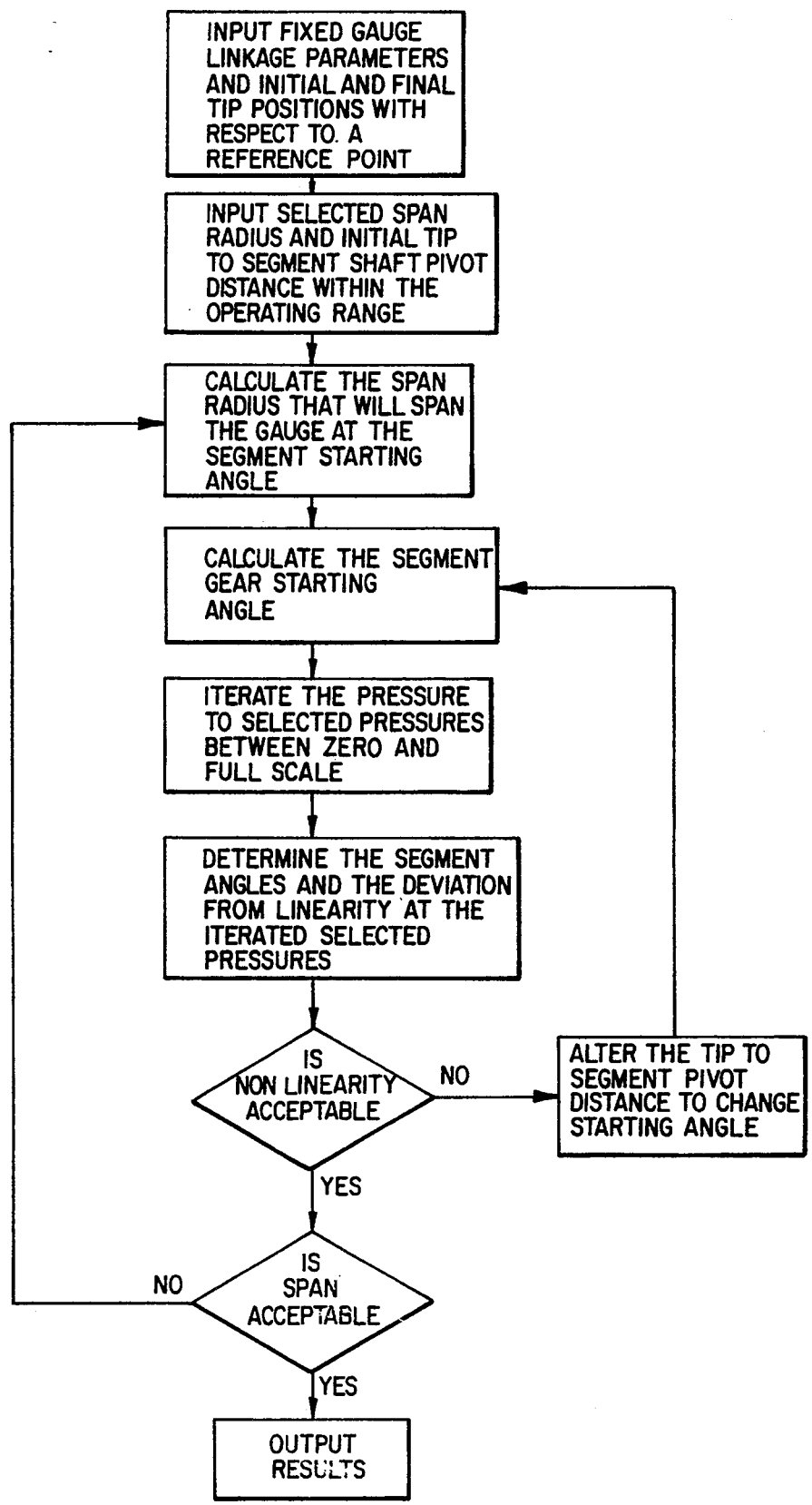
FIG. 8 is a block diagram showing how a computer may be programmed to aid in performing the method.

The data in Table 1 and FIG. 7 represents an example of the result of the inventive method using the actual dimension of a typical gauge. Note that the fixed elements are the link length, gear ratio, dial arc and the pinion to segment pivot distance. The span radius is variably adjustable and the tip travel and tip X and Y distances are precisely measured by visual equipment described below.

Note that the maximum non-lineadty in this particular example is 0.152 percent full scale at the 80% pressure point. This is between ⅛ and ¼%. Because the tip only moves a small amount, it should be measured in relation to the central axis to about plus or minus two ten thousandth's of an inch. (±0.0002"). This is preferably accomplished by a "Vision System" which is off the shelf equipment available from Adept Technology, 150 Rose Orchard Way, San Jose, California 95134. Adept Technology calls their equipment the AGS Vision System. It does not have to have any changes in its software in order to make the measurements. There are other systems available and even a manually operated optical comparator has been used to make the measurements but it takes an exceedingly long time to accomplish. It might also be noted that the calculations that are performed by the computer program to determine the percent non-linearity can also be done by hand although it is an exceedingly difficult and tedious procedure.

Figure 2A:
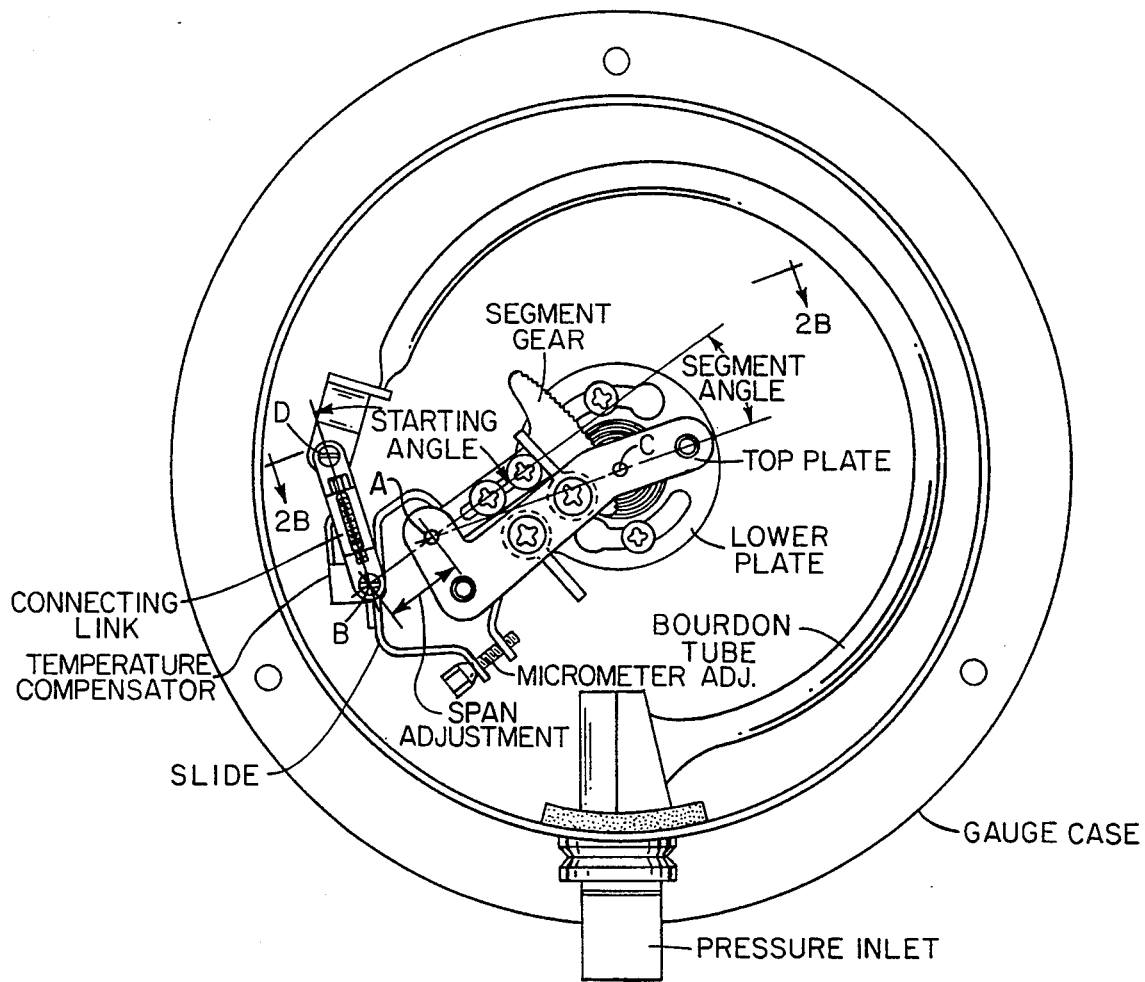
FIG. 2A is a front elevational view of a conventional Bourdon type gauge to which the calibration method of this invention is applicable.
Figure 2B:
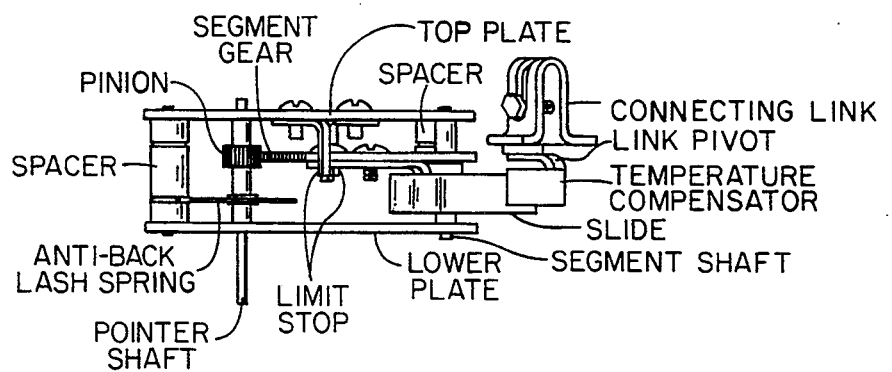
FIG. 2B is a partial sectional view of the gauge of FIG. 2A.

The back of the typical gauge case is a cylindrical area that holds the linkage and Bourdon tube. It is seen in FIG. 2A, however, there is an additional backing plate 23 underneath the movement shown in FIG. 2C and FIG. 2A which is seen in outline in FIG. 4. The Bourdon tube is fixed to the backing plate at the inlet end portion. The remainder of the movement is removably and rotatably mounted on backing plate 23 which is removable from the back of the case. It is removed in order to make the measurements with the vision system. Only the backing plate and Bourdon tube are present to make the measurements. The measurements of the initial and final positions of the tip (D) are made with reference to at least one and preferably two openings in the backing plate. One opening 50 in FIG. 4 is the opening for one of the screws which secures the lower plate of the movement. The other is an opening for a bushing (C) through which the pointer shaft is extended and represents the center of the movement. The center of this opening is the preferable reference point for establishing the reference point on a reference plane for determining the X and Y coordinate location of the movable tip. It is the center of the movement.

What has been used is a 19"rack mountable AGS vision controller with a manual control pendant, a Y60 terminal and a high resolution monitor. Three Pulnex TM540 cameras are used, two downward mounted and one horizontal mounted camera. The gauge tube and backing plate are fixtured to a camera copy stand. Air pressure is supplied to the Bourdon tube via a pressure regulator.

The vision system is used to determine the position of the hole in the tip (D) which connects to the connecting link (12) with respect to the two holes in the back plate, hole 50 and another hole in the center of the movement which is hidden by the lower plate 25.

In the best mode the height of the tip hole relative to the surface of the mounting bracket is also preferably measured. The vertical height measurements are not really part of the method except as a check against the possibility that the tube may move vertically as well as horizontally during its movement to such an extent that it would possibly bind the linkage. Enough vertical movement to bind the linkage would not normally occur without manufacturing defects so the height measurements serve as a quality control feature. A tube that would bind the linkage should not be used.

A 100 millimeter Schneider lens is used to find the tip hole position. It is a very high quality flat lens. A 50 millimeter lens is used to find the two backing plate holes for a frame of reference and finally a 75 millimeter lens is used to measure the height of the tip relative to the surface of the mounting bracket. An Arista brand DC fluorescent light is mounted directly beneath the gauge tube and a Mini-Mite brand DC fluorescent light used to light the background for the height measuring. The AGS Vision System can rather rapidly make a large number of inspections of the hole location and then plot the data with the aid of statistics. In an example 51 inspections of the location of the holes was made and the data plotted. The inspection uses two different software routines from the Vision System, the first is called a fine edge ruler and the second is called an arc fitter. The rulers are placed to locate the hole in a field of view. The horizontal ruler is placed roughly in the center of the field of view and if the hole is not found, several other rulers will be placed as well. Once the hole is found, a vertical ruler is placed to find the height of the hole.

The second vision software routine, the arc fitter, is then used. It will very accurately find the center of the hole. The data is plotted relative to the coordinates of the Vision System and shows repeatability in the X and Y direction which is found to be repeatable to about 50/1,000,000 of an inch.

In determining the frame of reference relative to the two holes on the back plate 23, the field of view is much larger than in the previous inspection of the tip and will not be as repeatable. Two arc fitting tools are used to find the accurate center of the holes and the frame of reference is established relative to the smaller (center) hole through which the dial pointer shaft will pass when the gauge is reassembled.

With the air pressure set at zero, the Vision System inspects the location of the tip hole relative to the two holes in the back plate. The Vision System first inspects the two holes and establishes a frame of reference. It then finds the tip hole and determines the position of the hole relative to the back plate. The hole position information is displayed on the screen in an overall inspection time of approximately 1.5 seconds. The second of the holes, such as hole 50, simply makes it easier to establish the frame of reference with respect to the vision system field since the backplate 23 is made with the several holes including the center of the movement (C) lying along its center line axis.

Now in the example, the pressure in the tube is increased to full scale pressure. The same inspections are repeated again, and it is found that an increase in both the X and Y positions is due to the deflection of the tube. Then the height inspection is done using the Vision System. Once the determinations have been completed, the positional information is used in a computer program to determine the two prime variables, namely, the span radius and tip to segment pivot axis distance. After the corrected distances of these variables are obtained, it is only necessary to set them on the gauge itself, preferably within ±½ thousandths of an inch, by means of conventional mechanical measuring tools. It may be helpful to install special pins or collects on the parts whose distances are to be measured. It may also be desirable to make a small fixture which may be best described as a reverse "wood clamp" device with verniers on the ends of the bars to make accurate measurements between two elements. All of these are, believed to be conventional in the measuring art. As mentioned before, the actual gauge movement can be rotated on the supporting back plate 23 to move the segment gear pivot point location and thus the starting angle with respect to the tip. Once in position the supporting structure is secured to the back plate by screws.

Figure 2C:
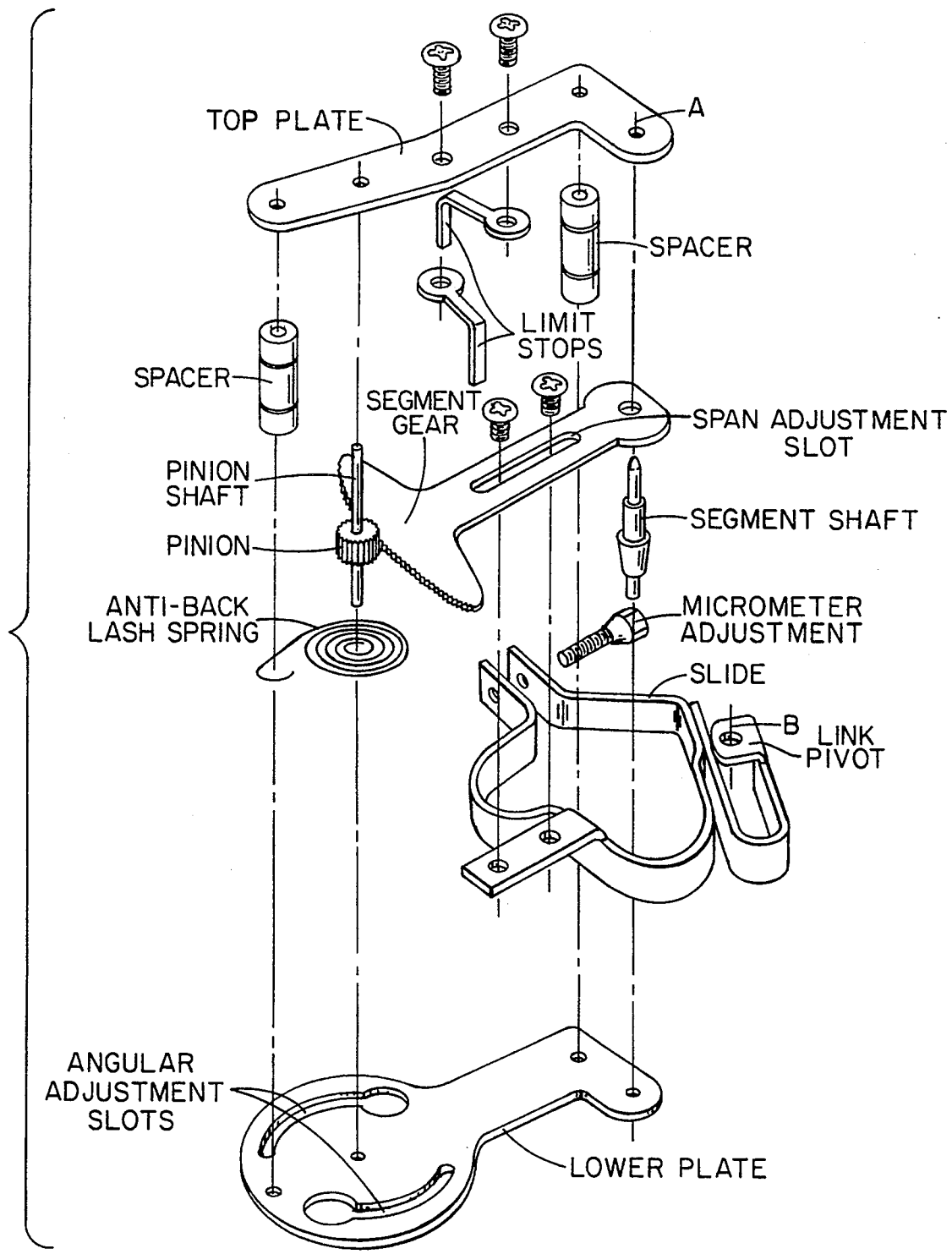
FIG. 2C is an exploded perspective view of the movement mechanism of the gauge of FIG. 2A.
Figure 3:
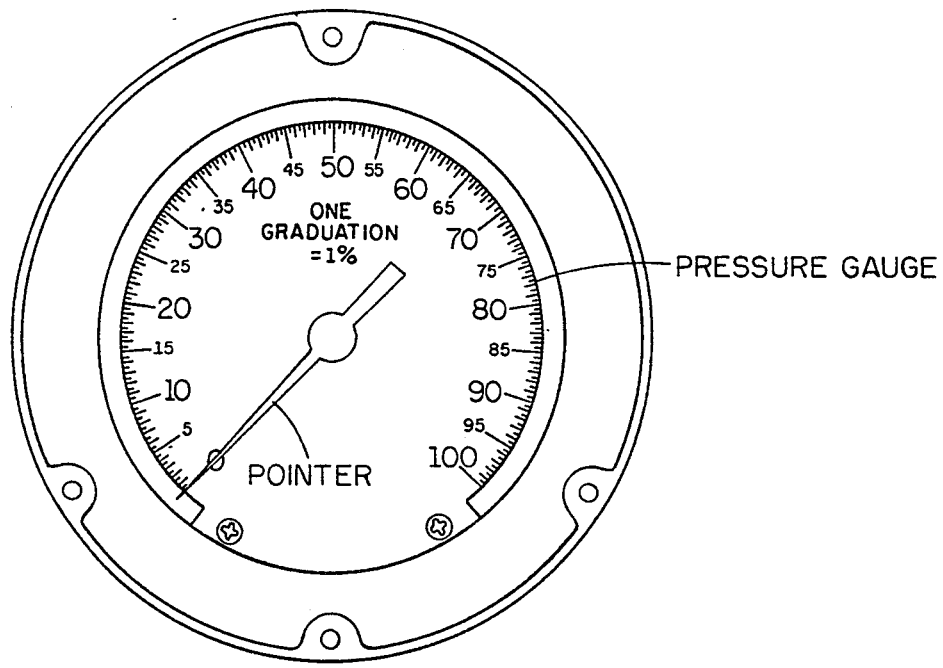
FIG. 3 is a front elevational view of the scale and pointer for the gauge of FIGS. 2A, 2B and 2C.

The exemplary gauges may have micrometer screws as shown in FIG. 2C which simplify the accurate setting of the span radius which has been determined by the method. Once the settings are made and the movement is locked into position, then the whole gauge movement is placed back into the cylindrical back of the base of the gauge and the gauge is assembled with the pointer set on zero. It was calibrated by the simple expedient of measuring and using the initial and final positions of the tip with respect to the center of the gauge represented by the hole in the back plate, which secures everything in the case for the gauge.

Although the method has been described as preferably being accomplished with a computer program that evaluates the percent non-linearity at incremental 10% amounts between zero and full gauge pressure, this is not a fundamental requirement but rather an arbitrary desirable practice because it permits the actual plotting of the non-linearity over the range of the gauge. This is desirable because it gives some assurance that the desired condition has been achieved and provides a permanent record which can be useful as customer information as well.

It is quite within the scope of the method based upon the physical measurements of the tip position with respect to the center to determine the span radius at the single 100% pressure condition in order to span the gauge to move the pointer from 0 to 270° by direct calculation or by incrementally adjusting a nominal span radius to achieve the desired spanning of the gauge as previously described (except for the 10% increments) and then utilize the incremented tip to segment pivot axis distance to minimize the non-linearity at the 50% or midpoint of the gauge range using the span radius previously determined. These two determinations alone will, according to the method, produce a calibrated gauge. It should also be noted that it is not necessary to actually utilize the full pressure point to calibrate the gauge. It is sufficient if the measurements are made at zero gauge pressure and at some intermediate gauge pressure between zero and full pressure for the reason that what the method is really doing is determining the initial position and the pressure spring rate of the Bourdon tube element which, as has been said, is directly proportional to the applied pressure. Thus if some substantial intermediate pressure is applied and the intermediate tip position determined, the final tip position can be calculated if precise measurements have been made of the intermediate tip position.

I claim:

1. Method of calibrating pressure gauges having a gauge linkage comprising a pressure responsive element with a tip that moves proportionate to applied pressure, a segment gear pivoted in a movement on a pivot axis, with a gear portion drivingly engaging a pinion gear, shaft and pointer and having a gain producing lever arm adjustably connected at a span radius distance to one end of a link having its other end unrigidly linked to the tip, the movement being adjustable to alter the tip to segment gear pivot axis distance and angular position, the method comprising:

accurately measuring with respect to a reference position, the initial tip position at zero gauge pressure and final tip position at full gauge pressure;

selecting a nominal tip to segment pivot axis distance that will produce segment gear movement within the operating range for tip movement between initial and final positions;

determining the span radius that will move the segment gear through an arc equivalent to rotation of the pointer pinion gear between zero and full scale in response to tip movement from initial to final position;

determining the segment gear angle at the initial tip position using the measured initial and final tip positions and the geometry of the gauge linkage as a basis for calculating angular change of the segment gear at other tip positions;

incrementing the tip to segment pivot axis distance at an intermediate tip position most representative of gauge linkage non-linearity and calculating the non-linearity at incremented distances until an incremental distance is found which produces a desired low amount of non-linearity; and setting the determined span radius and incremented tip to segment pivot axis distance found, to produce a calibrated gauge movement with the desired amount of linearity.

2. The method of claim 1 wherein the steps are performed on a gauge having a bourdon tube as the pressure responsive element.

3. The method of claim 1 wherein the said intermediate tip position most representative of gauge linkage non-linearity is taken as a position halfway between initial and final tip positions.

4. The method of claim 1 wherein the step of incrementing the tip of segment pivot axis and calculating non-linearity is performed by a means for computing.

5. The method of claim 4 wherein the step of determining the span radius is performed by said means for computing.

6. The method of claim 1 wherein the initial and final position of the tip are measured to a tolerance as a percentage of tip travel between those positions which is less than the desired percentage of full scale non-linearity of the calibrated gauge.

7. The method of claim 6 wherein said tolerance is approximately plus or minus two ten thousandths of an inch.

8. The method of claim 6 wherein a vision system means for accurately measuring the initial and final tip positions is used to obtain the measurements.

9. The method of claim 8 wherein the reference position from which the measurements are established is an axis through the center of the pinion gear.

10. The method of claim 4 wherein said means for computing is a programmed computer means programmed to receive said nominal distance of the tip to segment gear pivot axis along with the fixed distances between the elements of the gauge linkage from the tip to the center of the pinion gear pointer shaft and said measured tip positions, said programmed computer means being responsive to said fixed distances and measured tip positions to determine the span radius and calculate said incremental tip to segment pivot axis distance which produces a desired low amount of non-linearity at the tip position most representative of gauge linkage non-linearity.

11. The method of claim 10 wherein the programmed computer means determines the incremental tip to segment pivot axis distance based upon trigonometric relationships between the fixed and measured elements of the geometry of the gauge linkage between the tip and the center of the pinion gear pointer shaft of the gauge.

12. The method of claim 10 wherein the method includes the step of determining the non-linearity of the gauge linkage at a plurality of positions of the tip intermediate said initial and final positions.

13. Method of calibrating pressure gauges having a gauge linkage comprising a pressure responsive element with a tip which moves proportionately to applied pressure, the tip being unrigidly linked at a gain producing span adjustment distance from the pivot point of a segment gear, the segment gear being pivoted in a movement drivingly engaging a pinion gear mounted in the movement, which rotates to operate a dial indicating pointer shaft and pointer, the movement being rotatably positioned about the pointer shaft to alter the starting angle of the segment gear, the method comprising:

selecting nominal distances for the gain producing span adjustment distance and the segment pivot axis distance from the tip;

accurately measuring the initial tip position at zero gauge pressure with respect to a reference point;

accurately measuring the final tip position at full gauge pressure with respect to a reference point;

determining deviation of the pinion gear rotation at the selected span distance from that pinion gear rotation which would reflect the correct range of the gauge caused by tip movement between initial and final positions;

repetitively altering the span adjustment distance and redetermining deviation of the pinion gear rotation until a corrected span adjustment distance is obtained which produces pinion gear rotation between initial and final positions of the tip, which spans the gauge;

repetitively altering the selected distance of the segment pivot axis to initial tip position and determining the resulting deviation in linearity at an intermediate tip position most selective of non-linearity, to converge the non-linearity to a desired low amount and thereby obtain a correct segment gear pivot axis to initial tip distance; and assembling the gauge using the corrected span distance and the corrected segment gear pivot axis to initial tip distance, to produce a calibrated gauge.

14. The method of claim 13 wherein said intermediate tip position most selective of non-linearity is taken as a position halfway between initial and final tip positions.

15. The method of claim 13 wherein the steps of accurately measuring the tip positions are performed on a gauge pressure element comprising a Bourdon tube.

16. The method of claim 15 wherein the measuring steps include the step of utilizing a vision system means to accurately measure the initial and final tip positions.

17. The method of claim 16 further including the steps of fixturing the Bourdon tube over a light source and projecting an image of the tip through a lens.

18. The method of claim 13 wherein the method is carried out with the aid of a programmed computer means.

19. The method of claim 18 wherein the programmed computer means is programmed to receive said nominal distances along with fixed distances between the elements of the gauge linkage connecting the tip to the pinion gear and said measured tip positions and having programming means responsive to said fixed distances and measured tip positions to determine the corrected span and segment gear pivot axis to initial tip distances.

20. The method of claim 19, wherein the programmed computer means for determining the corrected span and segment gear pivot axis to tip initial distances performs calculations based upon triangulation between said elements of the gauge linkage.

21. The method of claim 20 wherein said triangulation utilizes a triangle wherein one side is the link length and another side is the distance from the tip and the center at any selected position of the tip between initial and final position.

22. The method of claim 13 wherein the method includes the step of determining the non-linearity at a plurality of positions of the tip intermediate initial and final positions.

23. Method of calibrating pressure gauges having a mechanical gauge linkage train comprising a pressure responsive element with a tip which moves proportionate to applied pressure, the tip being unrigidly linked at a gain producing span adjustment distance from the pivot point of a segment gear, the segment gear being pivoted on a segment shaft in a movement drivingly engaging a pinion gear mounted in the movement to operate a dial indicating point shaft and pointer, the movement being rotatably positioned about the pointer shaft to alter the starting angle of the segment gear, the method comprising:

establish the known geometric parameters of the mechanical gauge linkage train connecting the movable tip of the pressure responsive element to the point shaft which rotates the gauge pointer over the face of the gauge;

accurately determine the initial location of said tip in a plane passing through the pointer shaft axis and generally parallel to the face of the gauge when assembled, with respect to a fixed location in the plane taken as a reference point location;

apply gauge pressure to the pressure responsive element and determine the resulting final location of said tip with respect to the reference point location;

using the known geometric parameters of the mechanical gauge linkage train and the determined initial and final positions of the tip of the pressure element with respect to the reference point and thus the other geometric parameters, calculate the initial and final angle of the segment gear at an assumed nominal gain producing span radius and an assumed nominal segment shaft pivot point to tip distance with respect to the reference plane;

increment or decrement the assumed nominal gain producing span radius to coverage the deviation in movement of the segment gear toward a magnitude of movement consistent with the desired full rotation of the pinion gear resulting from tip movement between initial and final position, to produce an adjusted span radius distance;

using the adjusting span radius, the geometric parameters and the initial and final position of the tip, determine the initial and halfway angular movement of the segment gear at the assumed nominal segment shaft pivot point to tip distance on the reference plane;

increment or decrement the assumed nominal segment shaft pivot point to tip distance to converge the deviation in movement of the segment gear toward a magnitude of movement consistent with the desired halfway rotation of the pinion gear resulting from tip movement between initial and halfway position, to produce an adjusted segment shaft pivot point to initial tip distance; and assemble the gauge using the adjusted span radius and adjusted segment shaft pivot point to initial tip distance to produce a calibrated gauge.

24. The method of claim 23 wherein the step of incrementing or decrementing the assumed nominal segment shaft pivot point to tip distance and calculating non-linearity is performed by a computer means.

25. The method of claim 24 wherein the step of determining the span radius is performed by said computer means.

26. The method of claim 23 wherein the initial and final position of the tip are measured to a tolerance as a percentage of tip travel between those positions which is less than the desired percentage of full scale non-linearity of the calibrated gauge.

27. The method of claim 26 wherein said tolerance is approximately plus or minus two ten thousandths of an inch.

28. The method of claim 26 wherein a vision system means for accurately measuring the initial and final tip positions is used to obtain the measurements.

29. The method of claim 24 wherein said computer means is programmed to receive said nominal distances along with the fixed distances between the elements of the mechanical gauge linkage train from the tip to the center of the pinion gear pointer shaft and said measured tip positions, said programmed computer means being responsive to said fixed distances and measured tip positions to determine the span radius and calculate said incremental tip to segment pivot point distance which produces a desired low amount of non-linearity at the tip position most representative of gauge linkage non-linearity.

30. Method of calibrating pressure gauges having a gauge linkage comprising a pressure responsive element with a tip which moves proportionate to applied pressure, the tip being unrigidly linked at a gain producing span adjusting distance from the pivot point of a segment gear, the segment gear being pivoted in a movement drivingly engaging a pinion gear mounted in the movement to operate a dial indicating pointer shaft and pointer at the center of the gauge linkage, the movement being rotatably positioned about the pointer shaft to alter the starting angle of the segment gear, the method comprising:

accurately measuring the tip position by determining the actual initial and final X-Y coordinate location of the tip of the pressure responsive element with respect to the center of the gauge linkage at zero and full gauge pressure;

assigning a rough value to the adjustable parameters for span radius and tip to segment gear pivot distances;

computing the angular displacement of the segment gear at selected percentages of tip movement over the full range of tip movement from initial to final position wherein the segment-pinion gear ratio turns the pinion shaft in an arc which corresponds to the arc of the pointer across the face of the gauge;

computing the deviation at full scale caused by insufficient or excessive movement of the segment gear because of the amount of gain produced by the rough span radius value assigned;

determining a corrected span radius by repeatedly adjusting the rough span radius value to alter the gain and repeatedly computing the resulting deviation until the deviation is converged to a desired low level representative of a gain that will span the gauge over the range of actual tip movement from initial to final position;

using the corrected span radius, recomputing the angular displacement of the segment gear at selected percentages of tip movement over the full range tip movement from initial to final position at least including one percentage representative of a known minimum non-linearity position for gauges of the type being calibrated;

computing the deviation at said known minimum non-linearity position caused by insufficient or excessive movement of the segment gear because of gauge geometry resulting from the rough tip to segment gear value assigned, other than that resulting from an uncorrected span radius;

determining a corrected tip to segment gear pivot distance by repeatedly calculating an adjusted tip to segment gear pivot distance to alter the angle of the segment gear and repeatedly computing the resulting linearity deviation until the deviation at the selected known minimum non-linearity position is converged to a desired low level representative of a calibrated gauge; and assembling the gauge using the corrected span radius and corrected tip to segment span pivot point distance to produce a calibrated gauge.

31. The method of claim 30 wherein the steps of accurately measuring the tip positions are performed on a gauge pressure element comprising a Bourdon tube.

32. The method of claim 31 wherein said one percentage representative of a known minimum non-linearity position is taken as a position halfway between initial and final tip positions.

33. The method of claim 32 wherein the accurately measuring steps include the step of utilizing a vision system means to accurately measure the initial and final tip positions.

34. The method of claim 33 further including the steps of fixturing the Bourdon tube over a light source and projecting an image of the tip through a lens.

35. The method of claim 34 wherein the initial and final position of the tip are measured to a tolerance as a percentage of tip travel between those positions which is less than the desired percentage of full scale non-linearity of the calibrated gauge.

36. The method of claim 35 wherein said tolerance is approximately plus or minus two ten thousandths of an inch.

37. The method of claim 36 wherein the settings of corrected span radius distance ad corrected tip to segment pivot point distance are set to tolerances which as a percentage of said distances are less than the desired percent non-linearity full scale of the calibrated gauge.

38. Method of calibrating pressure gauges pressure gauges having a pressure responsive element having a tip which moves proportionate to applied pressure, the element being unrigidly linked at a gain producing span adjusting distance from the pivot point of a segment gear, the segment gear being pivoted in a movement drivingly engaging a pinion gear mounted in the movement to operate a dial indicating pointer shaft and pointer, the movement being rotatably positioned about the pointer shaft to alter the starting angle of the segment gear, the method comprising;

accurately determining the initial location of the tip of the pressure responsive element with respect to the pinion shaft at zero gauge pressure;

pressurizing the pressure responsive element to produce a substantial movement of the tip to a final location at full gauge pressure, accurately determining the final location of the tip of the pressure responsive element in its pressurized condition with respect to the pinion shaft;

using a computing means programmed for:

calculating the starting angle of the segment gear at a given link length using the initial tip location and a selected span radius and segment pivot point distance;

calculating the final angle of the segment gear at a given link length using the final tip location and said selected span radius and segment pivot point distance;

determining the angular deviation of the pinion shaft from movement equivalent to pointer rotation from zero to full scale;

incrementing or decrementing the span radius by an amount which is dependent on the magnitude of angular pinion shaft deviation and redetermining the resulting segment gear angle and angular movement at full scale and redetermining the deviation;

repeating said steps of determining the angular deviation of the pinion shaft and incrementing or decrementing the span radius by an amount which is dependent on the magnitude of angular pinion shaft deviation and redetermining the resulting segment gear angle and angular movement at full scale and redetermining the deviation until the deviation is reduced to a desired low amount to produce a corrected span distance which results in a gain in the segment gear that spans the gauge from zero to full scale as would be seen when a pointer is fixed to the pinion shaft;

using the corrected span distance to determine a new starting angle and the segment angle at preselected positions including a half-way point equivalent to half of the tip movement;

determining the deviation of the segment angle at the half-way point from the segment angle which would produce a mid-scale reading;

incrementing or decrementing the tip to segment pivot point distance depending upon the magnitude of the angular segment angle deviation converted to a deviation in tip to segment pivot point distance and redetermining the resulting deviation at the half-way position corresponding to the midpoint of the gauge;

repeating said steps of determining the deviation of the segment angle at the half-way point and incrementing or decrementing the tip segment pivot point distance depending upon the magnitude of the angular segment angle deviation converted to a deviation in tip to segment pivot point distance and redetermining the resulting deviation at the half-way position corresponding to the midpoint of the gauge until the deviation is reduced to a desired low amount to produce a corrected tip to segment shaft pivot distance; and assembling the gauge using the adjusted determined span radius and tip to segment shaft pivot point distance to produce a calibrated gauge.

* * * * *

UNITED STATES PATENT AND TRADEMARK OFFICE
CERTIFICATE OF CORRECTION

PATENT NO. : 5,345,400
DATED : September 6, 1994
INVENTOR(S) : Robert D. Bissell and
Nicholas E. Ortyl, III It is certified that error appears in the above-indentified patent and that said Letters Patent is hereby corrected as shown below:

On the title page item, [75], delete "Ronald" and insert --Robert--.

Col. 13, line 22, delete "of" and insert --to--.
Col. 15, line 20, delete "point" and insert --pointer--.
Col. 15, line 40, delete "coverage" and insert --converge--.
Col. 17, line 51, delete "pressure gauges".

Signed and Sealed this

Tenth Day of January, 1995

Attest:

BRUCE LEHMAN

Attesting Officer     Commissioner of Patents and Trademarks